United States Patent [19]

Umezawa et al.

[11] 3,925,354
[45] Dec. 9, 1975

[54] PROCESS FOR THE PRODUCTION OF AN 1-N-(S)-ALPHA-SUBSTITUTED-W-AMINOACYL) DERIVATIVE OF NEAMINE, 3',4'-DIDEOXYNEAMINE, RIBOSTAMYCIN OR 3',4'-DIDEOXYRIBOSTAMYCIN

[75] Inventors: Hamao Umezawa; Sumio Umezawa, both of Tokyo; Osamu Tsuchiya, Yokohama, all of Japan

[73] Assignee: Zaidan Hojin Biseibutsu Kagaku Kenkyu Kai, Tokyo, Japan

[22] Filed: Oct. 1, 1973

[21] Appl. No.: 402,086

[30] Foreign Application Priority Data
Oct. 6, 1972 Japan.............................. 47-99866

[52] U.S. Cl............................ 260/210 AB; 424/180
[51] Int. Cl.$^2$............................................ C07H 1/00
[58] Field of Search................... 260/210 K, 210 AB

[56] References Cited
UNITED STATES PATENTS
3,753,973  8/1973  Umezawa et al................ 260/210 K
3,781,268  12/1973  Kawaguchi et al.............. 260/210 K OTHER PUBLICATIONS
Chem. Abstracts, Vol., 22, Division 6, 1922 p. 4211 (h).

Wagner & Zook, Synthetic Org. Chemistry, Wiley & Sons, Inc., New York, 1953, p. 646.

Primary Examiner—Johnnie R. Brown
Assistant Examiner—Cary Owens
Attorney, Agent, or Firm—James C. Haight

[57] ABSTRACT

A new process of synthetizing an 1-N-[(S)-α-substituted-ω-aminoacyl] derivatives of aminoglycosidic antibiotic, including known compounds such as butirosin B as well as new compounds such as the derivatives of neamines and deoxyribostamycins, is provided according to this invention, in which process the initial aminoglycosidic antibiotic is poly-N-alkloxy- or -aralkyloxy- or aryloxy-carbonylated, the resulting poly-N-alkyloxy- or aralkyloxy- or aryloxy-carbonylated product is treated with a strong base such as sodium hydroxide or an alkali metal hydride to form the cyclic carbamate derivative according to new reactions and in which the cyclic carbamate derivative is treated with a weak base such as barium hydroxide to convert the 1-amino group of the antibiotic selectively into the free state while the other amino groups still remain in the protected condition. The 1-amino group of the antibiotic having the other amino groups protected is then acylated by reacting with the (S)-α-substituted-ω-amino acid, and the acylation product is treated so as to remove the amino-protecting groups, giving the desired compound.

18 Claims, No Drawings

PROCESS FOR THE PRODUCTION OF AN 1-N-(S)-ALPHA- SUBSTITUTED-W-AMINOACYL) DERIVATIVE OF NEAMINE, 3', 4'-DIDEOXYNEAMINE, RIBOSTAMYCIN OR 3',4'-DIDEOXYRIBOSTAMYCIN

This invention relates to a new process for the production of 1-N-[(S)-α-substituted-ω-aminoacyl] derivatives of neamine, 3',4'-dideoxyneamine, ribostamycin or 3',4'-dideoxyribostamycin which are useful for the treatment of various bacterial infections.

Kanamycins and neamine (that is, neomycin A) are well known aminoglycosidic antibiotics, and ribostamycin is also a known aminoglycosidic anitibotic, originally designated vistamycin or Antibiotic SF-733 see the "Journal of Antibiotics" Vol. 23, No. 3, pages 155–161 and No. 4, pages 173–183 (1970). This ribostamycin has been identified as 5-O-β-D-ribofuranosyl-neamine. These aminolycosidic antibiotics have been used widely as valuable chemotherapeutic agents, but many strains which are resistant to these known antibiotics have occurred in recent years. In these circumstances, the mechanism of resistance of drug-resistant bacteria to the known aminoglycosidic antibiotics has been studied. For instance, one of the present inventors, H. Umezawa have found that some R-factor carrying strains of gram-negative bacteria, *Staphylococcus aureus* and *Pseudomonas aeruginosa* isolated from patients are resistant to the action of kanamycins and that these kanamycin-resistant strains have a mechanism of resistance in that they produce an enzyme capable of phosphorylating the 3'-hydroxyl group of kanamycins and inactivate the kanamycins with aid of the phosphorylating enzyme; see "Science" Vol. 157, page 1559 (1967).

On the basis of this finding, H. Umezawa et al have propared semi-synthetically 3'-deoxykanamycin and 3',4'-dideoxykanamycin B wherein the 3'-hydroxyl group of the kanamycin molecule has been removed therefrom, as well as 3',4'-dideoxyneamine and 3',4'-dideoxyribostamycin (namely, 3',4'-dideoxyvistamycin) as described in the "Journal of Antibiotics" Ser. A, Vol. 21, pages 274–275 (1971); Vol 24, pages 485–487; Vol. 24, pages 711–712 (1971) and Vol. 25, pages 613–617 (1972). 3'-deoxykanamycin; 3',4'-dideoxykanamycin B; 3',4'-dideoxyneamine and 3',4'-dideoxyribostamycin are actually effective against the above-mentioned kanamycin-resistant strains, but these deoxy-derivatives have now been found to be practically inactive against other kanamycin-risistant strains such as *Escherichia coli* JR66/W677 which has been isolated from patients. H. Umezawa et al have found that the latter kanamycin-resistant strains have a mechanism of resistance in that they produce an enzyme capable of adenylylating the 2''-hydroxyl group of kanamycin or 3',4'-dideoxykanamycin molecule with ATP (adenosine triphosphate) and inactivate kanamycin and 3',4'-dideoxykanamycin through the action of this adenylylating enzyme; see the "Journal of Antibiotics" Vol. 24, pages 911–913 (1971). Furthermore, it has been found that a class of the drug-resistant gramnegative bacteria such as R-factor carrying strains of *Escherichia coli* for example, *Escherichis coli* JR66/W677 and LA290R55 has the mechanism of resistance in that it produces an enzyme capable of nucleotidylating the 2''-hydroxyl group of the kanamycin A and 3',4'-dideoxykanamycin B molecule and inactivates the kanamycin and 3',4'-dideoxykanamycin B with aid of this enzyme; see the "Journal of Antibiotics" Vol. 25, page 492 (1972).

On the other hand, it is known that butirosin B which is an aminoglycosidic antibiotic produced by a *Streptomyces microorganism* species is active against some kanamycin-resistant bacteria as well as against some ribostamycin-resistant bacteria. Butirosin B has been identified as 1-N-((S)-α-hydroxy-γ-amino-n-butyryl)-ribostamycin (see the "Tetrahedron Letters" Vol. 28, page 2125 and pages 2617–2630 (1971) and German Offenlegungsschrift No. 1914527). From comparison of the antibacterial activity of ribostamycin with that of butirosin B, we have found that the (S)-α-hydroxy-γ-amino-butyryl substituent at the 1-amino group of the butirosin B molecule has an important role in enabling the ribostamycin to be active against even the ribostamycin-resistant as well as and -sensitive strains and that the presence of the (S)-α-hydroxy-γ-amino-butyryl substituent at the 1-amino group of the butirosin B molecule results in such a steric hindrance of the butirosin B molecule by which the butirosin B can be prevented from being inactivated by the various inactivating enzymes which are produced by the kanamycin-resistant strains or ribostamycin-resistant strains.

From the above findings, we had an expectation that, in general, an 1-N-((S)-α-substituted -ω-aminoacyl) derivatives of neamine, 3',4'-dideoxyneamine, ribostamycin or 3',4'-dideoxyribostamycin would be usefully effective against the drug-resistant bacteria, if it could be synthetized. Accordingly we have made our further research in an attempt to exploit an efficient process by which an 1-N-((S)-α-substituted-ω-aminoacyl)-derivative of neamine, 3',4'-dideoxyneamine, ribostamycin or 3',4'-dideoxyribostamycin can be synthesized.

An object of this invention, therefore, is to provide a process of producing an 1-N-((S)-α-substituted-ω-aminoacyl) derivative of neamine, 3',4'-dideoxyneamine, ribostamycin or 3',4'-dideoxyribostamycin which may be carried out in high yield and without the need to effect complicated isolation and purification of the intermediate products and final products. Other objects of this invention will be clear from the following descriptions.

In our research, we have discovered the following facts: With a cyclohexane ring containing an equatorial amino group attached to a carbon atom of said ring as well as a hydroxyl group attached to another carbon atom adjacent to the first-mentioned carbon atom and existing in the trans-equatorial position relative to said amino group and in which the amino group has been converted into a urethane group of the formula —NH—CO—OR' where R' is an alkyl group of 1–4 carbon atoms, an aralkyl group such as benzyl or an benzyl or an aryl group such as phenyl, there is formed a cyclic carabamate between the amino group and the hydroxyl group when such cyclohexane ring is reacted with a strong base such as an alkali metal hydroxide, for example, sodium hydroxide or an alkali metal hydride such as sodium hydride in a non-aqueous reaction medium. Moreover, when this cyclic carbamate so formed is treated in an aqueous medium with a weak inorganic base which will not decompose the N-acylated linkage, for example, an alkali metal carbonate such as sodium carbonate; an alkaline earth metal hydroxide such as barium hydroxide and magnesium hydroxide or a weak organic base such as hydrazine, the cyclic carbamate is selectively hydrolized to regenerate the free amino group and the free hydroxyl group. That is, we have discovered new reactions by which a group (A) may be converted via a cyclic carbamate (B) into a group (C) as shown generally by the following reaction equation:-

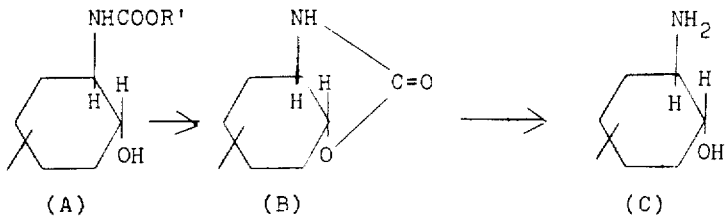

We have devised the process of this invention on the basis of our discovery of the above-mentioned new reactions. According to the present invention, there is provided a process for the production of an 1-N-[(S)-α-substituted-ω-aminoacyl] derivative of neamine, 3',-4'-dideoxyneamine, ribostamycin or 3',4'-dideoxyribostamycin of the formula:

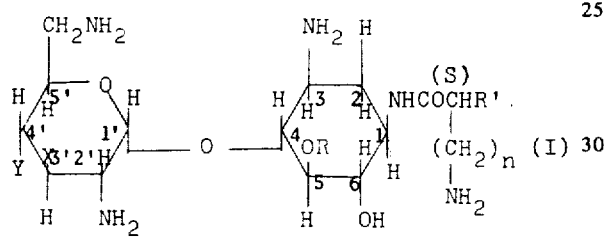

wherein $R_1$ is a hydroxyl group or amino group $-NH_2$ or an acylamino group $-NHR_2$ in which $R_2$ is an acryl group, particularly an alkanoyl group of 1–4 carbon atoms such as acetyl; $n$ is an integer of 1, 2, 3 or 4; R is a hydrogen atom or β-D-ribofuranosyl group of the formula:

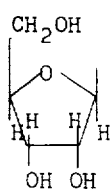

X and Y each is a hydrogen atom or a hydroxyl group and are identical to each other, which comprises reacting a strong base such as an alkali metal hydride, particularly sodium hydride, with a tetra-N-alkyloxycarbonylated, tetra-N-aralkyloxycarbonylated or tetra-N-aryloxycarbonylated aminoglycoside of the formula:

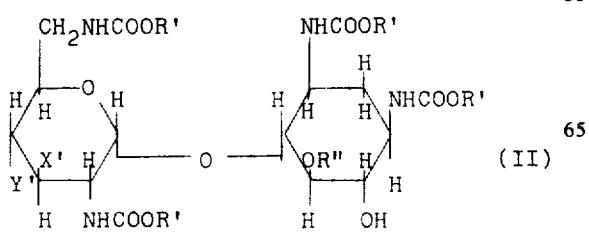

wherein R' is an alkyl group of 1–4 carbon atoms, an aralkyl group or an aryl group; R" is a hydrogen atom, a known hydroxyl-masking group or a substituted or unsubstituted β-D-ribofuranosyl group of the formula:

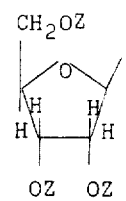

in which Z is a known hydroxyl-masking group or a hydrogen atom; X' and Y' are identical to each other and each is a hydrogen atom, a hydroxyl group or a group —OZ' in which Z' is a known hydroxyl-masking group, in a non-aqueous reaction medium to produce a cyclic carbamate of the formula:

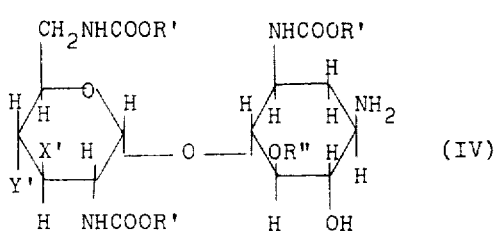

in which R', R", X' and Y' have the same meanings as defined above; then partially hydrolyzing this cyclic carbamate of the formula (III) in an aqueous reaction medium by treating it with a weak base to produce a tri-N-alkyloxycarbonylated, tri-N-aralkyloxycarbonylated or tri-N-aryloxycarbonylated aminoglycosidic antibiotic derivative of the formula:

in which R', R'', X' and Y' have the same meanings as defined above; then reacting the derivative of the formula (IV) with an (S)-α-substituted-ω-amino acid of the formula:

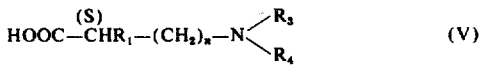 (V)

wherein $R_1$ and $n$ have the same meanings as defined above, and $R_3$ and $R_4$ each is a hydrogen atom or a known amino-masking group such as an acyl group, particularly an alkanoyl group of 1–4 carbon atoms, an alkyloxycarbonyl group of 1–5 carbon atoms, an aralkyloxycarbonyl group and an aryloxycarbonyl group, or $R_3$ and $R_4$ together form a phthaloyl group, or $R_3$ and $R_4$ together from a group $=CHR_5$ in which $R_5$ is a hydrogen atom, an alkyl group of 1–4 carbon atoms or an aryl group, particularly phenyl, in a manner known for the acylation, to produce as the acylation product an 1-N-[(S)-α-substituted-ω-aminoacyl] derivative of the tri-N-alkyloxycarbonylated, tri-N-aralkyloxycarbonylated or tri-N-aryloxycarbonylated aminoglycosidic antibiotic of the formula:

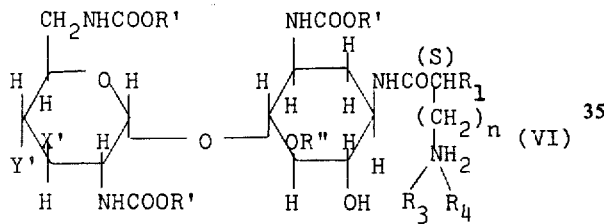

in which R', R'', X', Y', $R_1$, $R_3$ and $R_4$ have the same meanings as defined above, and finally converting the alkyloxycarbonyl, aralkyloxycarbonyl or aryloxycarbonyl groups —COOR', the remaining other amino-masking groups and the remaining hydroxyl-masking groups of the acylation product of the formula (VI) into hydrogen atoms, respectively in a known manner, to produce the desired compound of the formula (I).

The symbol (S) shown in the above formulae (I), (V) and (VI) is an expression of the steric configuration of organic compounds; see R. S. Cahn, C. K. Ingold & V. Prelog's "Experientia" Vol. 12, pages 81–94 (1956).

With respect to the tetra-N-alkyloxycarbonylated, tetra-N-aralkyloxycarbonylated or tetra-N-aryloxy-carbonylated aminoglycosidic antibiotic of the formula (II) which is used as the starting material for the process of the present invention, it may preferably be the tetra-N-benzyloxycarbonylated neamine, 3',4'-dideoxyneanine, -dideoxynneamine, ribostamycin or 3',4'-dideoxyribostamycin. Generally, however, R' may suitably be an alkyl such as methyl, ethyl, tert-butyl and tert-amyl; or R' may suitably be an aralkyl such as benzyl and p-nitrobenzyl; or R' may suitably be an aryl such as phenyl. The hydroxyl groups for OR'', X', Y', OZ and the 6-hydroxyl group present in the starting compound of the formula (II) may all remain in the free form, but, if desired, all or parts of the hydroxyl groups (for OR'', X', Y' and OZ) other than the 6-hydroxyl group of the starting compound (II) may be protected by a known hydroxylmasking group such as an acyl group, particularly an alkanoyl of 1–6 carbon atom, for example, acetyl and an aroyl, for example, benzoyl; an aralkyl such as benzyl; an acetal group, a ketal group, a hemi-acetal group such as tetrahydropyranyl, methoxycyclohexyl; an α,β-ethylenically unsaturated alkyl group such as allyl, isopropylidene, or cyclohexylidene group or benzylidene group which may readily be cleavable by mild hydrolysis or hydrogenolysis in a manner known to the skilled in the art.

To prepare the starting compound of the formula (II), neamine, 3',4'-dideoxyneamine, ribostamycin or 3',4'-dideoxyribostamycin may be tetra-N-alkyloxycarbonylated, tetra-N-aralkyloxycarbonylated or tetra-N-aryloxycarbonylated by reacting the aminoglycosidic antibiotic with 4 or more molar proportions of a chloroformate of the formula:

or a p-nitrophenyl carbonate of the forumla:

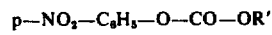

or an N-hydroxysuccinimide ester of the formula:

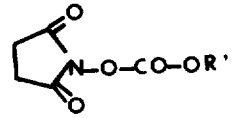

or an azidoformate of the formula:

in which R' has the same meaning as defined above, in a suitable solvent such as water, aqueous methanol, ethanol, acetone or a mixture thereof under neutral or basic conditions in a way known in the prior art of peptide synthesis. The reaction product so obtained usually comprises the tetra-N-alkyloxycarbonylated, tetra-N-aralkyloxycarbonylated or tetra-N-aryloxycarbonylated product. This product may then be reacted with a reagent which is known and commonly used to introduce a known hydroxyl-masking group, if it is desired to protect the hydroxyl groups of said product with the hydroxyl-masking group as mentioned before. Preferred examples of the known hydroxyl-masking group are methoxycyclohexyl, cyclohexylidene or benzylidene which may be introduced by using 1,1-dimethoxycyclohexane or benzaldehyde dimethyl acetal in solution in dimethylformamide together with p-toluene-sulfonic acid.

In carrying out the process of this invention, the reaction of a strong base or sodium hydride with the starting compound of the formula (II) may be effected in a non-aqueous reaction medium consisting of, for example, anhydrous dimethylformamide. Suitable examples of the strong base available for this purpose may be an alkali metal hydroxide such as sodium hydroxide. As an alkali metal hydride, sodium hydride is preferred and may be used in 1—3 molar proportions for one molar proportion of the starting compound of the formula (II). The cyclic carbamate of the formula (III) so formed is then recovered from the reaction mixture by neutralizing the reaction mixture with an acid such as acetic acid, pouring the neutralized reaction mixture into a large amount of a mixture of chloroform and water, separating the chloroform layer containing the cyclic carbamate dissolved therein, and concentrating the chloroform solution to afford the cyclic carbamate as a crude solid product. This crude product may be purified by column chromatography with silica gel and chloroform -ethanol.

The cyclic carbamate of the formula (III) so obtained is then subjected to a partial hydrolysis with a weak base to produce the aminol of the formula (IV). This partial hydrolysis may be carried out in an aqueous reaction medium such as aqueous dioxane or aqueous methanol. Suitable examples of the weak base available for this partial hydrolysis of the cyclic carbamate include an alkali metal carbonate such as sodium carbonate, an alkaline earth metal hydroxide such as barium hydroxide, magnesium hydroxide and calcium hydroxide; and an weak organic base such as hydrazine. The aminol of the formula (IV) so formed may be recovered from the reaction mixture by filtering the reaction mixture, concentrating the filtrate to dryness, extracting the residue with chloroform and evaporating the chloroform solution to give a crude product as the precipitate. The crude product may be purified by silica gel column chromatography.

The aminol of the formula (IV) is then reacted with the substituted amino acid of the formula (V) in a manner known for the acylation which is commonly effected in the prior art synthesis of amides. Thus, the aminol of the formula (IV) may be acylated by reacting with the substituted amino acid of the formula (V) in solution in dimethylformamide, acetone or tetrahydrofuran and in the presence of a dehydrating agent such as dicyclohexylcarbodiimide. The substituted amino acid of the formula (V) may also be used in the form of its acid chloride, its mixed acid anhydride, its activated esters or its azide derivative. Thus, it is also feasible that the substituted amino acid of the formula (V) is at first converted into its activated ester form of the formula:

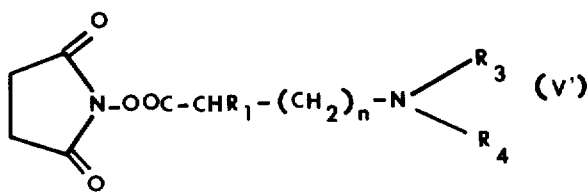

(V')

by reacting the amino acid with N-hydroxysuccimide in the presence of dicylcohexylcarbodiimide, and that the activated ester of the formula (V') so formed is then reacted with the aminol of the formula (IV) for 1-N-acylation of the latter. We prefer that the substituted amino acid of the formula (V) should be reacted with the aminol of the formula (IV) in substantially equimolar proportions of the substituted amino acid of the formula (V) which is used as the acylation agent in the process of this invention. Also, we prefer to use a substituted amino acid of the formula (V) in which $R_3$ is a hydrogen atom and $R_4$ is benzyloxycarbonyl group, or a substituted amino acid of the formula (V) in which $R_3$ and $R_4$ together form a phthaloyl group. An (S)-α-hydroxy-ω-N-phthalimido acid of the formula:

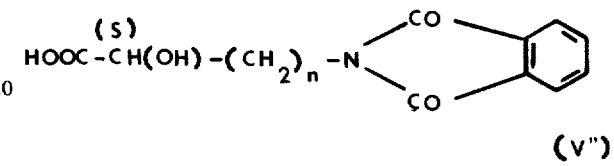

(V")

may be prepared by reacting a hydrochloride of an (S)-α,ω-diamino acid of the formula:

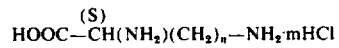

wherein $m$ is a whole number of 1 or 2, with a basic copper carbonate in an alkaline aqueous solution to form the copper carboxylate, reacting this copper carboxylate with N-carboethoxyphthalimido to form a copper salt of (S)-α-amino-ω-N-phthalimido acid of the formula:

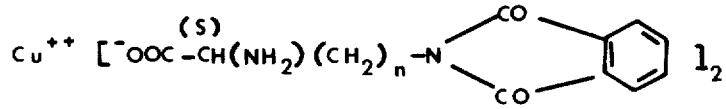

treating this copper salt with diluted hydrochloric acid in methanol to give the corresponding (S)-α-amino-ω-Nphthalimido acid hydrochloride and then reacting this hydrochloride with sodium nitrite in aqueous acetic acid to produce the desired (S)-α-hydroxy-ω-N-phthalimido acid (V"). When the above-mentioned (S)-α-amino-ω-N-phthalimido acid hydrochloride prepared as an intermediate in the above procedure is acetylated with acetic anhydride or acetyl chloride in a known manner, there may be prepared the corresponding (S)-α-N-acetylamino-ω-phthalimido acid, which may be employed as an (S)-α-substituted-ω-amino acid of the formula (V) in which $R_3$ and $R_4$ together form a phthaloyl group and $R_1$ is an acylamino group —$NHR_2$. When an (S)-α-substituted-ω-amino acid of the formula (V) wherein $R_3$ and $R_4$ are each hydrogen atom and $R_1$ is merely an amino group —$NH_2$ is to be employed, it is convenient that this amino acid is phthaloylated in a known manner to give the corresponding (S)-α,ω-diphthaloylamino acid which is then used for the acylation.

In the process of this invention, the acylation product of the formula (VI) which is formed by the reaction of the aminol (IV) with the amino acid (V) may be recovered from the reaction mixture by filtering the reaction mixture and concentrating the filtrate to dryness to give a crude product. This crude product may be purified by silica gel column chromatography. The acylation product of the formula (VI) so obtained is then treated so as to convert the remaining alkyl (or aralkyl or aryl) oxycarbonyl groups —COOR' as well as the possibly remaining amino-masking groups for $R_3$, $R_4$ and the possibly remaining hydroxyl-masking groups (for OR'', X', Y', OZ) of the acylation product into hydrogen atoms, respectively.

The conversion of the groups —COOR' and the amino-masking groups of the acylation product (VI) into hydrogen atoms, i.e. the removal of the groups —COOR' and the amino-masking group from the acylation product, may be achieved by following various procedures which are well known to the skilled in the art. The remaining alkyloxycarbonyl, aralkyloxycarbonyl or aryloxycarbonyl groups —COOR' of the acylation product may be regarded as one type of the known amino-masking groups. Accordingly, when the amino-masking group for the groups $R_3$ and $R_4$ of the acylation product (VI) is of an alkyloxycarbonyl group such as t-butoxycarbonyl, a cycloalkyloxycarbonyl group, or aryloxycarbonyl group or a group =$CHR_5$ such as salicylidene group, the removal of this kind of the amino-masking group from the acylation product may be effected by subjecting said acylation product (VI) to a moderate hydrolysis treatment with a weak acid such as aqueous trifluoro-acetic acid, aqueous acetic acid and diluted aqueous hydrochloric acid. When the aminomasking group is of an aralkyloxycarbonyl groups such as benzyloxycarbonyl, the removal of this sort of amino-masking group may be effected by subjecting the acylation product (VI) to a hydrogenolysis treatment in the presence of a palladium-carbon catalyst or to a treatment with hydrobromic acid and acetic acid. The o-nitrophenoxyacetyl group as the amino-masking group may be removed by a reductive treatment. When the amino-masking group is phthaloyl group, the removal of phthaloyl group from the acylation product may efficiently be achieved by treating hydrolytically the acylation product (VI) with hydrazine hydrate in solution in ethanol under heating. When the acylation product (VI) contains different kinds of the aminomasking groups, such acylation product may be subjected to simultaneous or successive treatments to remove the different amino-masking groups therefrom. For instance, when the acylation product (VI) contains the t-butoxycarbonyl group and the benzyloxycarbonyl group as the amino-masking group, these groups may be removed simultaneously by subjecting the acylation product to acidic catalytic hydrogenation with 5% palladium on carbon in 90% trifluoroacetic acid and methanol.

When the acylation product (VI) contains still the hydroxyl-masking groups of the acyl type such as alkanoyl and aroyl or allyl, isopropylidene, cyclohexylidene, benzylidene, tetrahydropyranyl or methoxycyclohexyl, the conversion of this acyl type of the hydroxylmasking group into hydrogen atom may be accomplished by mild hydrolysis using diluted hydrochloric acid or aqueous acetic acid. However, occasionally the hydroxyl-masking groups of the acyl type can partially be removed during the preceding partial hydrolysis of the cyclic carbamate (III) and/or at the same time as when the removal of the aminomasking group of a similar acyl type is effected. When the hydroxyl-masking group is of such type as benzyl, the removal of this type of the hydroxylmasking group may be achieved by catalytic hydrogenolysis in the presence of palladium on carbon. For instance, if the acylation product (VI) contains the benzyl group for the hydroxyl-masking group and the benzyloxycarbonyl group for the amino-masking group, simultaneous removal of these types of the hydroxylmasking group and amino-masking group takes place by effecting simultaneous debenzylation and de-benzyloxycarbonylation in such a manner that either such acylation product (VI) in solution in a mixture of dioxane, acetic acid and water is hydrogenated in the presence of palladium -carbon, or such acylation product (VI) in solution in liquid ammonia is treated with metallic sodium.

In the process of the present invention, there is produced the desired compound of the formula (I) after the removal of the group —COOR', the aminomasking group and the hydroxyl-masking group of the acylation product (VI) is effected. The desired compound of the formula (I) so produced may be recovered from the reaction mixture in which the removal of the aminomasking group and the hydroxyl-masking group took place, by concentrating the reaction mixture to dryness to give a crude form of the compound of the formula (I). The crude product of the formula (I) may be purified by an ion-exchange chromatography using, for example, a cation-exchange resin containing carboxylic functions, for example, a copolymer of methacrylic acid with divinylbenzene, such as Amberlite IRC 50 or Amberlite CG 50 (a product of Rohm & Hass Co., U.S.A., ammonium form), a molecular sieve such as CM-Sephadex C-25 (a product of Pharmacia Co., Sweden, ammonium form) or CM-cellulose. The eluate from the chromatographic process is collected in fractions, and the antibacterial activity of these fractions is detected using sensitive bacteria and resistent bacteria as the test microorganism. Through this detection of the antibacterial activity of each fraction, it is easy to locate the active fractions containing the desired compound of the formula (I) and to recover this desired compound from the active fractions in a manner known for the prior art production and recovery of the known aminoglycosidic antibiotics.

In a particular embodiment of the process of this invention, there is provided a process for the production of 1-N-[(S)-α-hydroxy-γ-aminobutyryl]-ribostamycin which comprises reacting sodium hydride with tetra-N-benzyloxycarbonyl-3',4'; 2'',3''-di-O-cyclohexylidene-5''-O-(1-methoxycyclohexyl) ribostamycin is a nonaqueous reaction medium to produce tri-N-benzyloxycarbonyl-3',4'; 2'',3''-di-O-cyclohexylidene-5''-O-(1-methoxycyclohexyl) ribostamycin-1,6-carbamate, partially hydrolyzing this first product by treating this product with barium hydroxide in an aqueous organic solvent to produce 3,2',6'-tri-N-benzyloxycarbonyl-3',4'; 2'',3''-di-O-cyclohexylidene-5''-O-(1-methoxycyclohexyl) ribostamycin, reacting this second product with (S)-α-hydroxy-γ-phthalimido-butyric acid or its N-hydroxysuccinimide ester to produce the 1-N-[(S)-α-hydroxy-γ-phthalimidobutyryl] derivative of the second product, treating this third product successively with hydrazine in an aqueous organic solvent to remove the phthaloyl group of the third product, with palladium -carbon and hydrogen to remove the benzyloxy-carbonyl groups of the third product and then with a diluted mineral acid to remove the cyclohexylidene and methoxycyclohexyl groups of the third product, whereby there is afforded 1-N-[(S)-α-hydroxy-γ-aminobutyryl] ribostamycin.

According to a further embodiment of the process of this invention, there is provided a process for the production of 1-N-[(S)-α-hydroxy-γ-aminobutyryl]-3',4'-dideoxyneamine, which comprises reacting sodium hydride with tetra-N-benzyloxycarbonyl-3',4'-dideoxyneamine in a non-aqueous reaction medium to produce 3,2',6'-tri-N-benzyloxycarbonyl-3',4'-dideoxyneamine-1,6-carbamate, partially hydrolyzing this first product by treating with barium hydroxide in an aqueous reaction medium to produce 3,2',6'-tri-N-benzyloxycarbonyl-3',4'-dideoxyneamine, reacting this second product with (S)-α-hydroxy-γ-phthalimidobutyric acid or its N-hydroxysuccinimide ester to produce 3,2',6'-tri-N-benzyloxycarbonyl-3',4'-dideoxy-1-N-[(S)-α-hydroxy-γ-phthalimido-butyryl] neamine, and then treating this third product successively with hydrazine in an aqueous organic solvent to remove the phthaloyl group of the third product and then with palladium-carbon and hydrogen to remove the benzyloxycarbonyl groups of the third product, affording the 3',4'-dideoxy-1-N-[(S)-α-hydroxy-γ-aminobutyryl] neamine.

3',4'-Dideoxy-1-N-[(S)-α-hydroxy-γ-aminobutyryl] ribostamycin and 3',4'-dideoxy-1-N-[(S)-α-hydroxy-γ-aminobutyryl] neamine are new substances which are not shown in any previous literature.

The present invention is now illustrated with reference to the following Examples to which the present invention is not limited in any way.

EXAMPLE 1

Synthesis of 1-N-((S)-α-hydroxy-γ-aminobutyryl) ribostamycin a. Tetra-N-benzyloxycarbonyl-3',4'; 2'',3''-di-O-cyclohexylidene-5''-O-(1-methoxycyclohexyl) ribostamycin (1.3 g of which preparation is described in the "Journal of Antibiotics" Vol. 25, No. 10, page 613, October, 1972) was dissolved in 15 ml. of anhydrous dimethylformamide. To this solution was added 97 mg of sodium hydride in the form of a suspension containing 50% by weight of sodium hydride in low-boiling hydrocarbons. The admixture was stirred for 3 hours under ice-cooling and then neutralized by addition of acetic acid. The neutralized reaction mixture was poured into a mixture of chloroform and water under stirring. The chloroform layer was separated, washed with water, dried over anhydrous sodium sulfate and then evaporated to distill off the solvent. The syrup so obtained was then purified by column chromatography with silica gel. A solid product was obtained in a yield of 930 mg (78%). Melting point 125°–128°C, $[\alpha]_D^{21}$ + 14.4° (c 2, chloroform). This product showed an infrared absorption peak at 1760 cm$^{-1}$ characteristic of the 5-membered cyclic carbamates.

Elemental analysis

Found: C 63.55, H 7.03, N 4.68%. Calculated for $C_{61}H_{78}N_4O_{18}$: C 63.42, H 6.80, N 4.85%.

This solid product was identified as tri-N-benzyloxycarbonyl-3',4'-; 2'',3''-di-O-cyclohexylidene-5''-O-(1-methoxycyclohexyl) ribostamycin-1,6-carbamate of the formula:

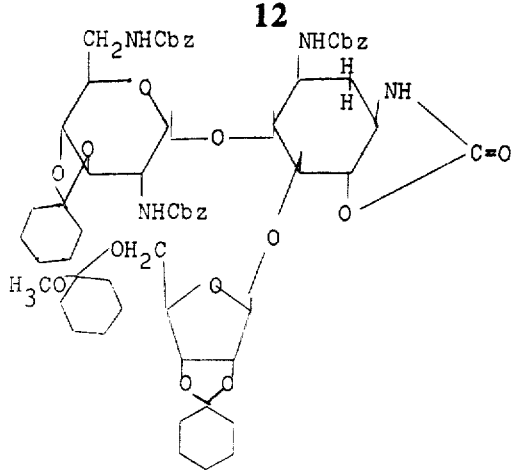

in which Cbz represents benzyloxycarbonyl group.

b. 500 mg of the carbamate produced in the preceding stage (a) was dissolved in 4.5 ml of waterdioxane (1:0.8), and the resulting solution was admixed with 300 mg of barium hydroxide octahydrate. The admixture was agitated at 95°C for 2 hours to effect the partial hydrolysis of the carbamate. The reaction mixture was filtered to remove the precipitate, and the dioxane was distilled off from the filtrate to give a residue which was then extracted with chloroform. The chloroform extract was washed with water, dried over anhydrous sodium sulfate and then distilled to remove the chloroform. The solid residue so obtained was purified by column chromatography with silica gel. A purified product was obtained in a yield of 303 mg (62%). Melting point 101°–106°C, $[\alpha]_D^{27}$ + 17° (c 2, chloroform). The absorption peak at 1760 cm$^{-1}$ characteristic of the cyclic carbamate, disappeared in the infrared absorption spectrum of this product.

Elemental analysis

Found: C 63.69, H 7.28, N 4.90%. Calculated for $C_{60}H_{80}N_4O_{17}$: C 63.81, N 7.14, N 4.96%.

This product was in the form of an aminol compound and was identified as 3,2',6'-tri-N-benzyloxycarbonyl-3',4'; 2'',3''-di-O-cyclohexylidene-5''-O-(1-methoxycyclohexyl) ribostamycin.

c. The aminol product of the preceding stage (b) (200 mg) was dissolved in anhydrous tetrahydrofuran, and the resulting solution was admixed with a solution in tetrahydrofuran of the activated ester of (S)-α-hydroxy-γ-N-phthalimido-n-butyric acid which had previously been prepared by reacting 62 mg of the substituted butyric acid, 27 mg of N-hydroxysuccinimide and 54 mg of dicyclohexylcarbodiimide with each other in anhydrous tetrahydrofuran. The admixture was agitated at ambient temperature overnight. The reaction mixture was filtered to remove the precipitate, and the filtrate was concentrated to dryness to give a crude acylation product. This crude product was purified by column chromatography with silica gel. A purified acylation product was obtained in a yield of 161 mg (67%). Melting point 156°–158°C, $[\alpha]_D^{27}$ + 9.9° (c 2, chloroform). An infrared absorption spectrum of this product showed absorption peaks at 1710 and 1655 cm$^{-1}$.

Elemental analysis

Found: C 63.58, H 6.56, H 5.04%. Calculated for $C_{72}H_{89}N_5O_{21}$: C 63.56, H 6.59, H 5.15%.

This product was identified as tri-N-benzyloxycarbonyl-3',4'; 2'',3''-di-O-cyclohexylidene-1-N-[(S)-α-hydroxy-γ-N-phthalimido-n-butyryl]-5''-O-(1-methoxycyclohexyl) ribostamycin.

d. 198 mg of the 1-N-[(S)-β-hydroxy-γ-N-phthalimido-n-butyryl] derivative produced in the above stage (c) was dissolved in 80% aqueous ethanol and then added with a small amount of hydrazine hydrate. The mixture was agitated at 60°C for 2 hours to effect the reaction for removing the phthaloyl group. The reaction mixture was concentrated to dryness under reduced pressure, and the solid residue was taken into chloroform. The chloroform solution was washed with water and concentrated to dryness to give the dephthaloylated product which was, in turn, dissolved in 4 ml of dioxane-water (3:1). The resulting solution was added with a small amount of acetic acid and subjected to hydrogenation with hydrogen using palladium black, so that the benzyloxycarbonyl group was removed by the hydrogenolysis. The reaction mixture was concentrated by evaporation of the dioxane and water to give a solid. This solid was then treated with 1N hydrochloric acid to remove the cyclohexylidene and methoxycyclohexyl groups, so that a crude hydrochloride of 1-N-[(S)-α-hydroxy-γ-amino-n-butyryl] ribostamycin was produced. This product was purified by a column of CM-Sephadex C-25 (a three dimensional gel network of detran provided with carboxymethyl radical as the weakly acidic ion-exchange functions, the ammonium form) using aqueous ammonia (0–0.5N) as the development agent. At the concentration of 0.4N ammonia, the desired product, 1-N-[(S)-α-hydroxy-γ-amino-n-butyryl] ribostamycin was eluted in yield of 51 mg (63%). $[\alpha]_D^{27} + 34°$ (c 2, water).

Elemental analysis

Found: C 43.65, H 7.49, N 12.08%. Calculated for $C_{21}H_{41}N_5O_{12}\cdot H_2O$: C 43.97, H 7.56, N 12.21%.

1-N-[(S)-α-hydroxy-γ-amino-n-butyryl] ribostamycin is shown by the formula:

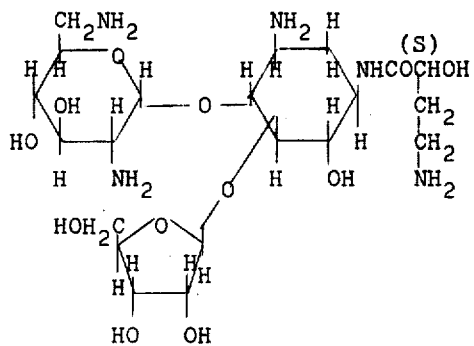

and is identical to butirosin B of natural origin.

The antibacterial spectrum of this product of Example 1 was determined and confirmed to be quite identical with that of butirosin B of natural origin. The antibacterial spectrum of this product is shown in Table 1 below.

TABLE 1

Antibacterial spectrum of synthetic butirosin B*

| Test organisms** | Minimal inhibitory concentration (mcg/ml) |
|---|---|
| Staphylococcus aureus FDA 209P | 1.56 |
| Escherichia coli K-12 | 0.78 |
| Escherichia coli ML 1629 | 1.56 |
| Escherichia coli ML 1630 | 1.56 |
| Escherichia coli ML 1410 | 0.78 |
| Escherichia coli ML 410 R 81 | 3.12 |
| Escherichia coli R 5 | 6.25 |
| Escherichia coli LA 290 R 55 | 0.78 |
| Escherichia coli LA 290 R 56 | 0.78 |
| Escherichia coli LA 290 R 64 | 0.78 |
| Escherichia coli C 600 R 135 | 0.78 |
| Escherichia coli J 5 R 11-2 | 1.56 |
| Escherichia coli W 677 | 0.39 |
| Escherichia coli JR 66/W 677 | >100 |
| Klebsiella pneumoniae type 22 No. 3038 | >100 |
| Pseudomonas aeruginosa A3 | 3.12 |
| Pseudomonas aeruginosa No. 12 | 6.25 |
| Pseudomonas aeruginosa H 9 | 3.12 |
| Pseudomonas aeruginosa H 11 | 25 |
| Pseudomonas aeruginosa Tl 13 | 25 |
| Pseudomonas aeruginosa GN 315 | >100 |
| Pseudomonas aeruginosa 99 | 50 |
| Mycobacterium smegmatis ATCC 607*** | 0.78 |

*The activity for the respective strain was quite identical with that of natural origin.
**Nutrient agar, 37°C. 17 hours
***Nutrient agar, 37°C. 42 hours

EXAMPLE 2

Synthesis of 1-N-[(S)-α-hydroxy-γ-amino-n-butyryl] neamine a. Neamine in 70% aqueous methanol was treated with benzyloxycarbonyl chloride to give tetra-N-benzyloxycarbonylneamine quantitatively, which was used without purification in the next step. This product (2 g) was dissolved in dimethylformamide (15 ml) and after addition of anhydrous p-toluenesulfonic acid (100 mg) and cyclohexanone dimethylketal (2.5 ml), the solution was treated at 50°C under 25 mm Hg for 25 minutes. Triethylamine was added and the solution was evaporated to dryness. The residue was chromatographed on a column of silica gel and chloroform and the portion containing the desired product was evaporated to give a solid, 630 mg, $[\alpha]_D^{20} + 36°$ (c 1, methanol).

Elemental analysis

Found: C 64.10, H 6.10, N 5.76%. Calculated for $C_{50}H_{58}N_4O_{14}$: C 63.95, H 6.23, N 5.97%.

This product was identified as tetra-N-benzyloxycarbonyl-3',4',-O-cyclohexylideneamine of the formula:

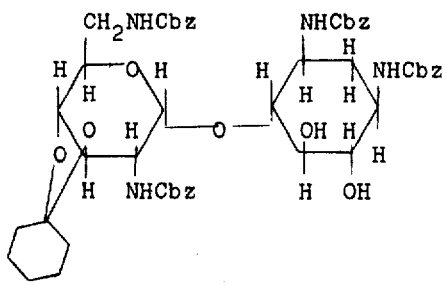

in which Cbz represents the benzyloxycarbonyl group.

b. 1.0 g of the cyclohexylidene derivative produced in the preceding stage (a) was dissolved in dimethylformamide and treated similarly as described in Example 1 (a) to give a product (640 mg), $[\alpha]_D^{20} + 45°$ (c 1, chloroform). This product showed an infrared absorption peak at 1760 cm$^{-1}$.

Elemental analysis

Found: C 62.31, H 6.18, N 6.99%. Calculated for $C_{43}H_{50}N_4O_{13}$: C 62.16, H 6.07, N 6.74%.

This product was identified as tri-N-benzyloxycarbonyl-3',4'-o-cyclohexylideneamine-1,6-carbamate.

c. The carbamate (320 mg) produced in the preceding stage (b) was dissolved in 6 ml of aqueous dioxane (1:1) and after heating the solution to 70°C, barium hydroxide octahydrate was gradually added until the solution become alkaline. It took approximately 3 hours. Hereafter the reaction mixture was treated similarly as described in Example 1 (b) to give a solid (240 mg), which was used in the next step without purification.

This product was identified as 3,2',6'-tri-N-benzyloxycarbonyl-3',4'-O-cyclohexylideneneamine.

d. The aminol product of the preceding stage (c) (220 mg) was dissolved in anhydrous tetrahydrofuran, and the resulting solution was admixed with a solution in tetrahydrofuran of the activated ester of (S)-α-hydroxy-γ-N-benzyloxycarbonylamido-n-butyric acid which was previously been prepared by reacting 100 mg of substituted butyric acid, 40 mg of N-hydroxysuccinimide with each other in anhydrous tetrahydrofuran. The admixture was agitated at ambient temperature overnight. The reaction mixture was filtered to remove the precipitate, and the filtrate was concentrated to dryness to give a crude acylation product. This crude product was purified by column chromatography with silica gel and chloroform-ethanol (10:1) as the developing solvent. A purified product was obtained in a yield of 150 mg, $[\alpha]_D^{20} + 24°$ (c 0.5, chlorofuran).

Elemental analysis

Found: C 62.42, H 6.27, N 6.77%. Calculated for $C_{54}H_{65}N_5O_{16}$: C 62.36, H 6.30, N 6.73%.

This product was identified as tri-N-benzyloxycarbonyl-3',4'-O-cyclohexylidene-1-N[(S)-α-hydroxy-γ-N-benzyloxycarbonylamido-butyryl]-neamine.

e. The acyl derivative product in the above stage (d) (120 mg) was dissolved in aqueous-dioxane (3:1) and after addition of a small amount of acetic acid, the solution was hydrogenated with palladium black to remove the benzyloxycarbonyl group. Then the product was treated with 1N hydrochloric acid to remove the cyclohexylidene group. Hereafter the resulting product was purified similarly as described in Example 1 d. Yield 38 mg, $[\alpha]_D^{20} + 40°$ (c 1, water).

Elemental analysis

Found: C 43.38, H 7.71, N 15.96%. Calculated for $C_{16}H_{33}N_5O_8·H_2O$: C 43.54, H 7.93, N 15.86%.

1-N-[(S)-α-Hydroxy-γ-amino-n-butyryl] neamine is shown by the formula:

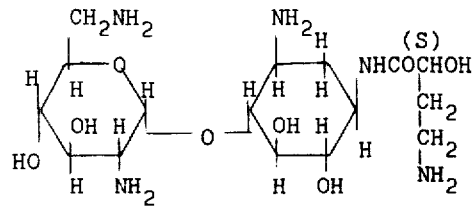

EXAMPLE 3

In a similar way to Example 1, 1-N-[(S)-α-hydroxy-γ-amino-N-butyryl]-3',4'-dideoxyneamine of the formula:

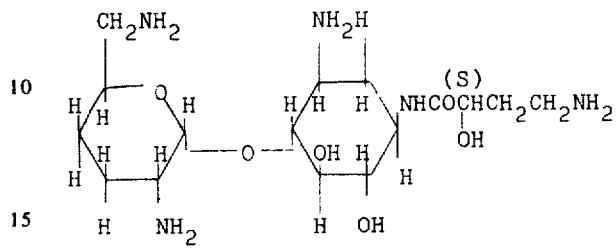

was synthetized from 3',4'-dideoxyneamine. Thus, 3',4'-dideoxyneamine was reacted with benzyloxycarbonyl chloride in 70% aqueous methanol to give tetra-N-benzyloxycarbonylneamine (1) in a yield of 80%, $[\alpha]_D^{25} + 45.4°$ (c 2, chloroform), which was then treated with sodium hydride as described above. Compound (1) was dissolved in dry DMF and after displacement of the air in the reaction vessel with nitrogen, 3 molecular equivalents of sodium hydride were added, and the mixture was agitated in an ice bath for 4 hours. The resulting clear solution was neutralized with acetic acid and poured into a mixture of a large amount of chloroform-water. The crude product obtained from the organic layer was purified by column chromatography with silica gel and chloroform-ethanol (20:1) to give tri-N-benzyloxycarbonyl-3', 4'-dideoxyneamine-1,6-carbamate (2) in a yield of 62%, mp 107°-110°C, $[\alpha]_D^{25} + 58°$ (c 1.9, chloroform). IR: 1765 cm$^{-1}$ trans-fused cyclic carbamate). [Calcd. for $C_{37}H_{42}N_4O_{11}$: C 61.83, H 5.89, N 7.80: Found: C 61.92, H 5.99, N 7.67].

Selective hydrolysis of the cyclic carbamate to the free aminol was effected with barium hydroxide in aqueous dioxane as described above, and the resulting ninhydrin-positive product, 3,2',6'-tri-N-benzyloxycarbonyl-3',4'-dideoxyneamine (3) was condensed with (S)-2-hydroxy-4-phthalimido-butyric acid by the method described in Example 1 and 3,2',6'-tri-N-benzyloxycarbonyl-3',4'-dideoxy-1-N-[(S)-2-hydroxy-4-phthalimido-butyryl] neamine (4) was obtained in a yield of 62% from (2), mp 228°-230°C (recrystallized from methanol), $[\alpha]_D^{22} + 32°$ (c 1.5, chloroform), IR: 1705, 1690, 1655, 1535 cm$^{-1}$. [Calcd. for $C_{48}H_{53}N_5O_{14}·H_2O$: C 61.20, H 5.89, N 7.43: Found: C 61.34, H 5.93, N 7.39].

Compound (4) was then treated with 4% hydrazine hydrate in 80% ethanol-dioxane (1:1) at 60°C for 2 hours to remove the phthaloyl group and then with palladium black and hydrogen in aqueous dioxane (1:1) to remove the benzyloxycarbonyl groups to give the final product, which was purified by a column of CM-Sephadex C-25 ($NH_4^+$ form) with ammonia (0–0.5N). At the concentration of 0.4N ammonia, the desired product was eluted, and further treatment gave 1-N-[(S)-4-amino-2-hydroxyburyryl]-3',4'-dideoxyneamine (5) as a monohydrate in a yield of 53% from compound (4) $[\alpha]_D^{22} + 38°$ (c 0.85, water), IR: 1650, 1560 cm$^{-1}$. Rf$_{3,4}$ -dideoxyneamine 0.47 (on paper chromatography with 1-butanol-pyridine-water-acetic acid (6:4:3:1). [Calcd. for $C_{18}H_{33}N_5O_6·H_2O$: C 46.93, H 8.62, N 17.10: Found: C 46.92, H 8.52, N 17.24].

The antibacterial spectrum of 3',4'-dideoxy-1-N-[(S)-α-hydroxy-γ-aminobutyryl] neamine is shown in the following table, together with those of 3',4'-dideoxyneamine and neamine for comparison.

TABLE 2

Antibacterial spectra of 3',4'-dideoxy-1-N-((S)-α-hydroxy-γ-aminobutyryl neamine, 3',4'-dideoxyneamine and neamine

| Test organisms* | Minimal inhibitory concentration (mcg/ml) | | |
| --- | --- | --- | --- |
| | 3',4'-Dideoxy-1-N-[(S)-α-hydroxy-γ-aminobutyryl] neamine | 3',4'-Dideoxy-neamine | Neamine |
| Staphylococcus aureus FDA 209P | 3.12 | 6.25 | 6.25 |
| Sarcina lutea PCI 1001 | 25 | 50 | >100 |
| Bacillus subtilis NRRL B-558 | <0.39 | 0.39 | 0.78 |
| Klebsiella pneumoniae PCI 602 | 6.25 | 25 | 12.5 |
| Klebsiella pneumoniae type 22 No. 3038 | 12.5 | 25 | >100 |
| Salmonella typhosa T-63 | 1.56 | 3.12 | 3.12 |
| Escherichia coli NIHJ | 3.12 | 12.5 | 12.5 |
| Escherichia coli K-12 | 3.12 | 6.25 | 6.25 |
| Escherichia coli R-5 | 50 | 50 | >100 |
| Escherichia coli ML 1629 | 3.12 | 12.5 | >100 |
| Escherichia coli ML 1630 | 3.12 | 12.5 | >100 |
| Escherichia coli ML 1410 | 3.12 | 6.25 | 12.5 |
| Escherichia coli ML 1410 R 81 | 12.5 | 25 | >100 |
| Escherichia coli LA 290 R 55 | 3.12 | 6.25 | 6.25 |
| Escherichia coli LA 290 R 56 | 3.12 | 6.25 | 12.5 |
| Escherichia coli LA 290 R 64 | 3.12 | 12.5 | 6.25 |
| Escherichia coli C 600 R 135 | 12.5 | 12.5 | 12.5 |
| Escherichia coli W 677 | 3.12 | 6.25 | 6.25 |
| Escherichia coli JR66/W 677 | 12.5 | 25 | >100 |
| Escherichia coli J 5 R 11-2 | 6.25 | 6.25 | >100 |
| Pseudomonas aeruginosa A3 | 6.25 | 25 | >100 |
| Pseudomonas aeruginosa No. 12 | 6.25 | 25 | >100 |
| Pseudomonas aeruginosa GN 315 | >100 | >100 | >100 |
| Pseudomonas aeruginosa 99 | 25 | 50 | >100 |
| Proteus rettgeri GN 311 | 25 | 50 | 100 |
| Proteus rettgeri GN 466 | 12.5 | 25 | 25 |
| Mycobacterium smegmatis ATCC 607** | 6.25 | 25 | 12.5 |

*Agar dilution streak method (nutrient agar, 37°C, 18 hours).
**48 hours.

EXAMPLE 4

Synthesis of 3',4'-dideoxy-1-N-[(S)-α-hydroxy-γ-aminobutyryl]-ribostamycin a. 3',4'-Dideoxyribostamycin see "Journal of Antibiotics", Vol. 25, page 613–616 (1972) was treated with benzyloxycarbonyl chloride in 70% methanol to give tetra-N-benzyloxycarbonyl-3',4'-dideoxyribostamycin quantitatively. This product (2.1 g) was dissolved in dimethylformamide and after addition of anhydrous p-toluenesulfonic acid (100 mg) and cyclohexanone dimethylketal (5 ml), the solution was heated at 50°C under 25 mm Hg for 1.5 hours and the solution was poured into 0.1N barium hydroxide solution. The resulting precipitate was collected and it was purified by silica gel column chromatography with benzene-ethyl acetate (1:4), yielding 1.7 g, $[\alpha]_D^{20} + 21°$ (c 2, chloroform).

Elemental analysis

Found: C 64.71, H 6.90, N 5.07%. Calculated for $C_{62}H_{78}N_4O_{17}$: C 64.68, H 6.83, N 4.87%.

This product was identified as tetra-N-benzyloxycarbonyl-2'',3''-O-cyclohexylidene-3',4'-dideoxy-5''-O-(1-methoxycyclohexyl) ribostamycin of the formula:

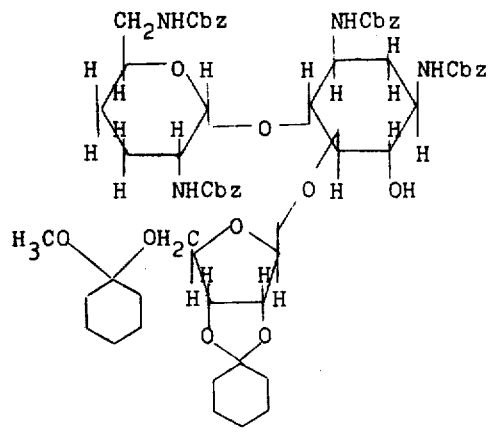

in which Cbz represents the benzyloxycarbonyl group.

b. The cyclohexylidene derivative (530 mg) produced in the preceding process (a) was dissolved in dry dimethylformamide (6 ml) and after addition of 50% sodium hydride (55 mg), the mixture was treated similarly as described in Example 1 (a) to give a product (390 mg), $[\alpha]_D^{20} + 18.3°$ (c 2, chloroform). Infrared absorption peak: 1760 cm$^{-1}$.

Elemental analysis

Found: C 63.56, H 6.75, N 5.42%. Calculated for $C_{55}H_{70}N_4O_{16}$: C 63.33, H 6.76, N 5.37%.

This product was identified as 3,2',6'-tri-N-benzyloxycarbonyl-2'',3''-O-cyclohexylidene-3',4'-dideoxy-5''-

O-(1-methoxycyclohexyl) ribostamycin-1,6-carbamate.

c. The carbamate (350 mg) prepared in the preceding process (b) was dissolved in 4 ml of aqueous dioxane and after addition of barium hydroxide octahydrate (240 mg), the mixture was treated similarly as described in Example 1 (b) to give a solid (210 mg), $[\alpha]_D^{20} + 18°$ (c 2, chloroform).

Elemental analysis

Found: C 63.64, H 7.23, N 5.68%. Calculated for $C_{54}H_{72}N_4O_{15}$: C 63.76, H 7.14, N 5.51%.

This product was identified as 3,2',6'-tri-N-benzyloxycarbonyl-2'',3''-O-cyclohexylidene-3',4'-dideoxy-5''-O-(1-methoxycyclohexyl) ribostamycin.

d. The aminol prepared by the preceding process was acylated similarly as described in Example 1 (c) to give a solid, $[\alpha]_D^{20} + 11°$ (c 2, chloroform).

Elemental analysis

Found: C 63.79, H 6.58, N 5.74%. Calculated for $C_{66}H_{81}N_5O_{19}$: C 63.50, H 6.54, N 5.61%.

This product was identified as tri-N-benzyloxycarbonyl-2'',3''-O-cyclohexylidene-3',4'-dideoxy-1-N-[(S)-α-hydroxy-γ-N-phthalimido-n-butyryl]-5''-O-(1-methoxycyclohexyl) ribostamycin.

e. The acyl derivative (70 mg) was deblocked similarly as described in Example 1 (d) to give a solid (21 mg), $[\alpha]_D^{20} + 26°$ (c 1, water).

Elemental analysis

Found: C 46.61, H 7.92, N 12.85%. Calculated for $C_{21}H_{41}N_5O_{10}\cdot H_2O$: C 46.57, H 8.00, N 12.93%.

3',4'-Dideoxy-1-N-[(S)-α-hydroxy-γ-amino-n-butyryl] ribostamycin is shown by the formula:

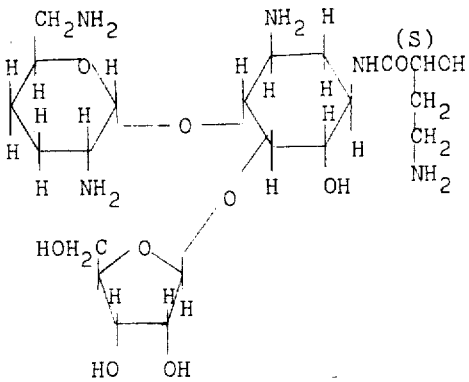

The synthetic 3',4'-dideoxy-1-N-[(S)-α-hydroxy-γ-aminobutyryl] ribostamycin, that is 3',4'-dideoxybutirosin B, showed strongly enhanced antibacterial activity as compared with that of ribostamycin and 3',4'-dideoxyribostamycin and was comparable to that of butirosin B. Moreover it was effective against *Klebsiella pneumoniae* type 22 No. 3038 and *Escherichia coli* K-12 JR 66/W 677, which were resistant to butirosin B. E. coli K-12 JR 66/W 677 is known to produce an enzyme phosphorylating 3'-hydroxyl group of butirosin A.

TABLE 3

| | Antibacterial spectra of 3',4'-dideoxybutirosin B, butirosin B, 3',4'-dideoxyribostamycin and ribostamycin | | | |
|---|---|---|---|---|
| | Minimal inhibitory concentration(mcg/ml) | | | |
| Test organisms* | 3',4'-dideoxy-butirosin B | Butirosin B | 3',4'-dideoxy-ribostamycin | Ribostamycin |
| *Staphylococcus aureus* FDA 209P | 1.56 | 1.56 | 3.12 | 3.12 |
| *Sarcina lutea* PCI 1001 | 25 | 50 | >100 | 100 |
| *Bacillus subtilis* NRRL B-558 | <0.39 | 0.39 | 1.56 | 3.12 |
| *Klebsiella pneumoniae* PCI 602 | 0.78 | 0.78 | 3.12 | 1.56 |
| *Klebsiella pneumoniae* type 22 No. 3038 | 3.12 | >100 | 6.25 | >100 |
| *Salmonella typhosa* T-63 | 0.39 | 0.39 | 1.56 | 1.56 |
| *Escherichia coli* NIHJ | 1.56 | 3.12 | 6.25 | 6.25 |
| *Escherichia coli* K-12 | 1.56 | 0.78 | 3.12 | 3.12 |
| *Escherichia coli* R-5 | 6.25 | 6.25 | 100 | 50 |
| *Escherichia coli* ML 1629 | 1.56 | 1.56 | >100 | >100 |
| *Escherichia coli* ML 1630 | 0.78 | 1.56 | >100 | >100 |
| *Escherichia coli* ML 1410 | 0.78 | 0.78 | 6.25 | 3.12 |
| *Escherichia coli* ML R81 | 1.56 | 3.12 | >100 | >100 |
| *Escherichia coli* LA 290 R55 | 1.56 | 0.78 | 3.12 | 3.12 |
| *Escherichia coli* LA R56 | <0.39 | 0.78 | 1.56 | 3.12 |
| *Escherichia coli* LA R64 | 1.56 | 0.78 | 3.12 | 1.56 |
| *Escherichia coli* C600 R 135 | 0.78 | 0.78 | 3.12 | 1.56 |
| *Escherichia coli* W 677 | 0.78 | 0.39 | 3.12 | 1.56 |
| *Escherichia coli* JR 66/W | 3.12 | >100 | 6.25 | >100 |
| *Escherichia coli* JSR 11-2 | <0.39 | 1.56 | 100 | >100 |
| *Pseudomonas aeruginosa* A 3 | 6.25 | 3.12 | 6.25 | >100 |
| *Pseudomonas aeruginosa* No. 12 | 6.25 | 6.25 | 12.5 | >100 |
| *Pseudomonas aeruginosa* GN 315 | >100 | >100 | >100 | >100 |
| *Pseudomonas aeruginosa* 99 | 25 | 50 | 50 | >100 |
| *Proteus rettgeri* GN 311 | 12.5 | 6.25 | 6.25 | 12.5 |
| *Proteus rettgeri* GN 466 | 3.12 | 3.12 | 6.25 | 6.25 |
| *Mycobacterium smegmatis* ATCC 607** | <0.39 | 0.78 | 3.12 | 6.25 |

*Agar dilution streak method (nutrient agar, 37°C, 18 hours).
**48 hours.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages conditions.

What we claim is:

1. A process for preparing an aminoglycosidic antibiotic aminol derivative of the formula

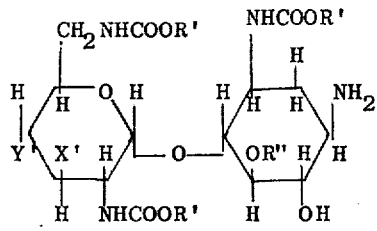

wherein
R' is alkyl of 1–4 carbon atoms, benzyl, p-nitrobenzyl or phenyl;
R'' is hydrogen, alkanoyl of 1–6 carbon atoms, benzoyl, benzyl, tetrahydropyranyl, methoxycyclohexyl, allyl, isopropylidene, cyclohexylidene, benzylidene or β-D-ribrofuranosyl of the formula

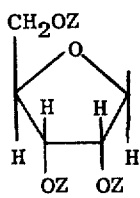

wherein Z
is hydrogen, alkanoyl of 1–6 carbon atoms, benzoyl, benzyl, tetrahydropyranyl, methoxycylohexyl, allyl, isopropylidene, cyclohexylidene or benzylidene; and
X' and Y' are both hydrogen, hydroxyl or —OZ' wherein Z' is alkanoyl of 1–6 carbon atoms, benzoyl, benzyl, tetrahydropyranyl, methoxycylohexyl, allyl, isopropylidene, cyclohexylidene or benzylidene; which comprises:
a. reacting a compound of the formula

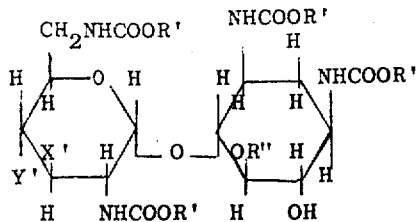 (II)

wherein
R', R'', X' and Y' have the above-indicated values with an alkali metal hydroxide or an alkali metal hydride in a non-aqueous reaction medium to form a cyclic carbamate of the formula

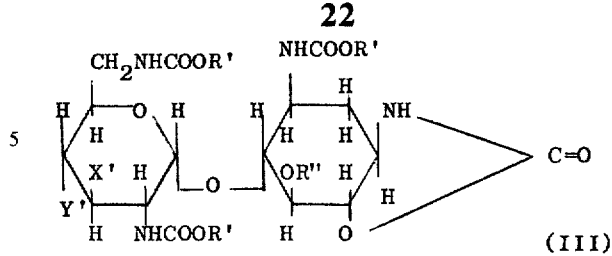 (III)

wherein
R', R'', X' and Y' have the above-indicated values; and
b. partially hydrolyzing said cyclic carbamate in an aqueous reaction medium with a weak base selected from the group consisting of alkali metal carbonates, alkaline earth metal hydroxides and hydrazine to form said aminoglycosidic antibiotic aminol derivatives.

2. A process according to claim 1, wherein R'', X', Y', Z and Z' are each cyclohexylidene or methoxycyclohexyl.

3. A process according to claim 1, wherein R' is benzyl.

4. A process according to claim 1 wherein tetra-N-benzyloxycarbonylated neamine, 3',4'-dideoxyneamine, ribostamycin or 3',4'-dideoxyribostamycin is used as the starting compound of formula (II).

5. A process according to claim 1 wherein the alkali metal compound in step (a) is sodium hydroxide or sodium hydride.

6. A process according to claim 1 wherein one molar proportion of the starting compound of formula (II) is reacted with 1–3 molar proportions of sodium hydride to form the cyclic carbamate of formula (III).

7. A process according to claim 1 wherein the weak base in step (b) is barium hydroxide.

8. A process according to claim 1 wherein R' is benzyl; R'', X', Y', Z and Z' are each cyclohexylidene or methoxycyclohexyl; the alkali metal compound in step (a) is sodium hydroxide or sodium hydride; and the weak base in step (b) is barium hydroxide.

9. A process according to claim 1, further comprising reacting said cyclic carbonate with an (S)-α-substituted amino acid of the formula

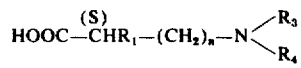

wherein
$R_1$ is hydroxyl, amino or alkanoylamino of the formula $-NHR_2$ in which $R_2$ is alkanoyl of 1–4 carbon atoms;
n is an integer 1, 2, 3 or 4;
$R_3$ and $R_4$ are each hydrogen, alkanoyl of 1–4 carbon atoms, alkyloxycarboxyl of 1–5 carbon atoms, phenylalkoxycarboxyl of 1–5 carbon atoms in the alkyl group or phenyloxycarboxyl; or $R_3$ and $R_4$ together form phthaloyl or $=CHR_5$ wherein $R_5$ is hydrogen, alkyl or 1–4 carbon atoms or phenyl;
to produce a substituted aminoglycosidic antibiotic of the formula

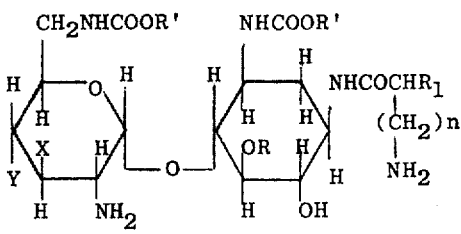

wherein R', R'', X', Y', R₁, R₃ and R₄ have the above-indicated values.

10. A process according to claim 9, wherein R₁ is hydroxyl.

11. A process according to claim 9, wherein n is 2.

12. A process according to claim 9, wherein R₃ and R₄ together form phthaloyl.

13. A process according to claim 9 wherein said amino acid is (S)-α-hydroxy-γ-aminobutyric acid.

14. A process according to claim 9 wherein said amino acid is the N-hydroxysuccinimide ester of (S)-α-hydroxy-γ-phthalimidobutyric acid.

15. A process according to claim 9, further comprising reducing said —COOR', R–, X' and Y' to hydrogen to form an 1-N-(S)-α-substituted-γ-aminoacyl derivative of neamine, 3',4'-dideoxyneamine, ribostamycin or 3',4'-dideoxyribostamycin of the formula:

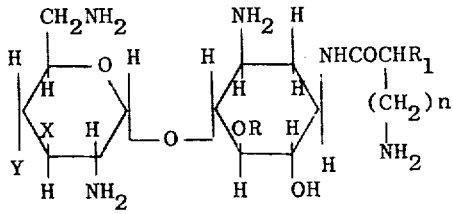

wherein

R₁ and n have the above-indicated values; R is hydrogen or β-D-ribofuranosyl; and X and Y are both hydrogen or hydroxyl.

16. A process according to claim 15 in which 1-N-[(S)-α-hydroxy-γ-aminobutyryl]ribostamycin is produced, comprising:
 a. reacting sodium hydride with tetra-N-benzyloxycarbonyl-3',4'; 2'',3''-di-O-cyclohexylidene-5''-O-(1-methoxycyclohexyl) ribostamycin in a non-aqueous reaction medium to produce tri-N-benzyloxycarbonyl-3',4'; 2'',3''-di-O-cyclohexylidene-5''-O-(1-methoxycyclohexyl) ribostamycin-1,6-carbamate;
 b. partially hydrolyzing the resultant carbamate with barium hydroxide in an aqueous organic solvent to produce 3,2',6'-tri-N-benzyloxycarbonyl-3',4'; 2''-,3''-di-O-cyclohexylidene-5''-O-(1-methoxycyclohexyl) ribostamycin;
 c. reacting the resultant partially hydrolyzed product with (S)-α-hydroxy-γ-phthalimidobutyric acid or its N-hydroxy-succinimide ester to produce the 1-N-[(S)-α-hydroxy-α-phthalimidobutyryl] derivative thereof; and
 d. reacting the resultant derivative successively with hydrazine in an aqueous organic solvent to remove the phthaloyl group thereof, with palladium-carbon and hydrogen to remove the benzyloxycarbonyl groups thereof and then with a dilute mineral acid to remove the cyclohexylidene groups thereof to form 1-N-[(S)-α-hydroxy-γ-amino-butyryl] ribostamycin.

17. A process according to claim 15 in which 1-N-[(S)-α-hydroxy-γ-aminobutyryl]-3',4'-dideoxyneamine is produced, comprising:
 a. reacting sodium hydride with tetra-N-benzyloxycarbonyl-3',4'-dideoxyneamine in a non-aqueous reaction medium to produce 3,2',6'-tri-N-benzyloxycarbonyl-3',4'-dideoxyneamine-1,6-carbamate;
 b. partially hydrolyzing the resultant carbamate with barium hydroxide in an aqueous reaction medium to produce 3,2',6'-tri-N-benzyloxycarbonyl-3',4'-dideoxyneamine;
 c. reacting the resultant partially hydrolyzed product with (S)-α-hydroxy-γ-phthalimido-butyric acid or its N-hydroxysuccinimide ester to produce 3,2',6'-tri-N-benzyloxycarbonyl-3',4'-dideoxy-1-N-[(S)-α-hydroxy-γ-phthalimido-butyryl] neamine; and
 d. treating the resultant product successively with hydrazine in an aqueous organic solvent to remove the phthaloyl group thereof and then with palladium-carbon and hydrogen to remove the benzyloxycarbonyl groups thereof to form 3',4'-dideoxy-1-N-[(S)-α-hydroxy-γ-aminobutyryl]neamine.

18. A process according to claim 15 in which 1-N-[(S)-α-hydroxy-γ-aminobutyryl]neamine is produced, comprising:
 a. reacting sodium hydride with tetra-N-benzyloxycarbonyl-3',4'-O-cyclohexylidene-neamine in a non-aqueous reaction medium to produce 3,2'-6'-tri-N-benzyloxycarbonyl-3',4'-O-cyclohexylidene-neamine-1,6-carbamate;
 b. partially hydrolyzing the resultant carbamate with barium hydroxide in an aqueous reaction medium to produce 3,2',6'tri-N-benzyloxycarbonyl-3',4'-O-cyclohexylidene-neamine;
 c. reacting the resultant partially hydrolyzed product with (S)-α-hydroxy-γ-benzyloxycarbonylaminobutyric acid or its N-hydroxy-succinimide ester to produce 3,2',6'-tri-N-benzyloxycarbonyl-3',4'-O-cyclohexylidene-1-N[(S)-α-hydroxy-γ-benzyloxycarbonylamino-butyryl] neamine; and
 d. treating the resultant product successively with hydrazine in an aqueous organic solvent to remove the phthaloyl group thereof and then with palladium-carbon and hydrogen to remove the benzyloxycarbonyl groups thereof to form 1-N-[(S)-α-hydroxy-γ-aminobutyryl]neamine.

* * * * *